Mar. 3, 1925.
G. A. KAY
1,528,432
TAKEDOWN FLOATING LINK COUPLING
Filed Dec. 1, 1921
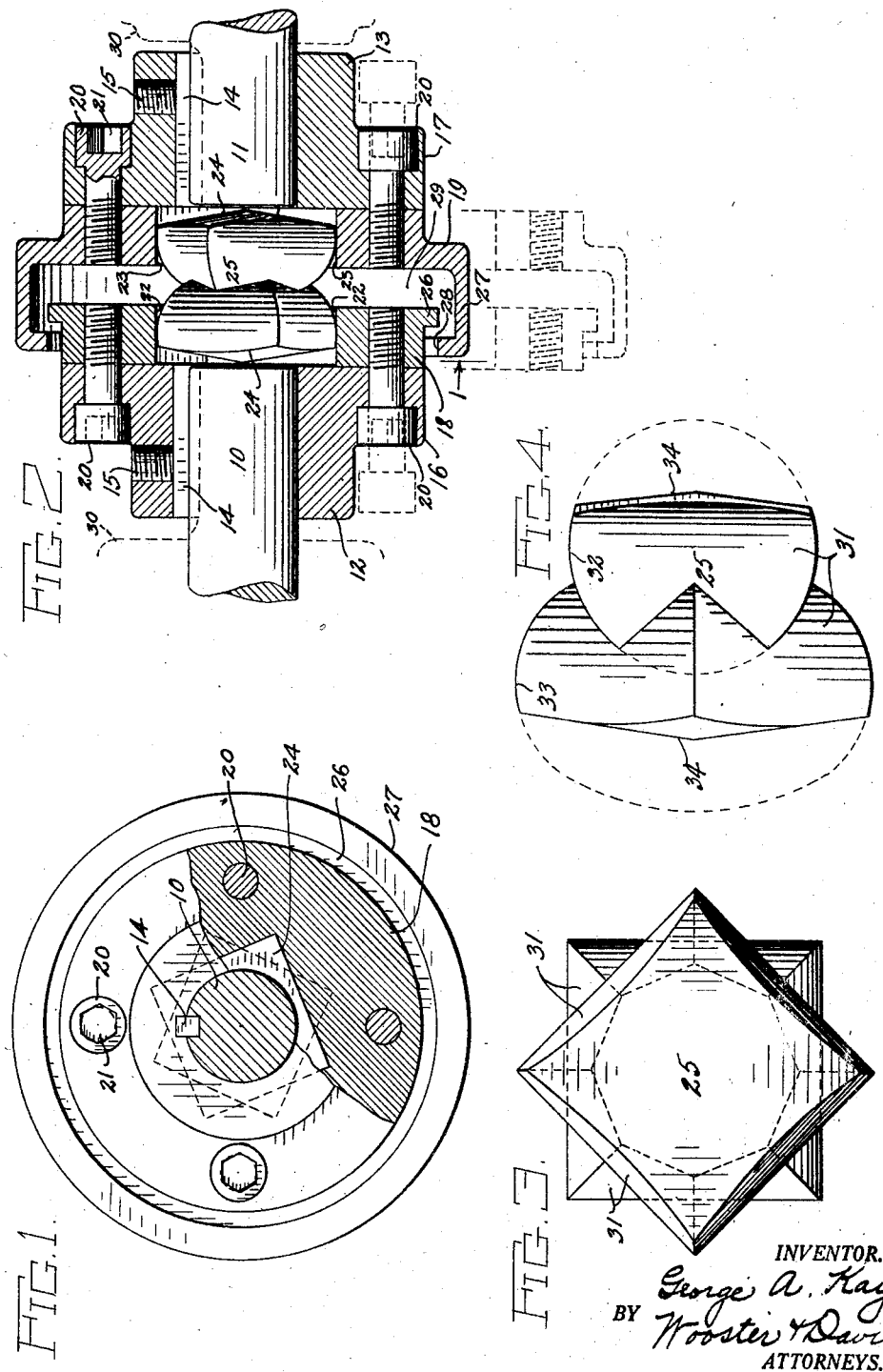
INVENTOR.
George A. Kay
BY Wooster & Davis
ATTORNEYS.

Patented Mar. 3, 1925.

1,528,432

UNITED STATES PATENT OFFICE.

GEORGE A. KAY, OF SOUTH NORWALK, CONNECTICUT, ASSIGNOR TO THE WHITNEY ENGINEERING COMPANY, OF NORWALK, CONNECTICUT, A CORPORATION OF CONNECTICUT.

TAKEDOWN FLOATING-LINK COUPLING.

Application filed December 1, 1921. Serial No. 519,136.

*To all whom it may concern:*

Be it known that I, GEORGE A. KAY, a citizen of the United States, residing at South Norwalk, county of Fairfield, State of Connecticut, have invented an Improvement in Takedown Floating-Link Couplings, of which the following is a specification.

This invention relates to shaft couplings and particularly flexible couplings, and has for an object to provide a flexible coupling which may be placed in position to connect two sections of shaft or may be removed therefrom without sliding either section of shaft longitudinally or move the shafts in any way.

It is a further object of the invention to provide a coupling of this character which is simple and substantial in construction and so is not easily gotten out of order, and which may be easily and quickly applied to and removed from the shaft.

With the foregoing and other objects in view I have devised the improved coupling illustrated in the accompanying drawing, in which—

Fig. 1 is an end view of my improved coupling, a portion thereof being broken away to show the interior construction.

Fig. 2 is a longitudinal vertical section.

Fig. 3 is an end view of the floating link, and

Fig. 4 is a side view thereof.

This coupling is so constructed that it may be applied to and removed from coupling position on adjacent shaft sections without moving either of said shaft sections. The opposed ends of two adjacent shaft sections are indicated at 10 and 11 which are spaced apart somewhat, as is shown in the drawing. If the coupling is to be substituted for another coupling, already in position, it may be necessary to cut off a portion of the end of one shaft to give the proper clearance between the ends of the sections. The coupling proper comprises two complementary hubs or primary coupling members 12 and 13 provided with suitable means for securing them to the ends of the shaft sections 10 and 11, respectively. This means is preferably a key 14 in suitable keyways in the hubs and shafts, but which has a tight fit in the shaft keyways and a loose fit in the hub keyways, to allow longitudinal movement of the hubs or primary coupling members in placing them in or removing them from operative position on the shafts. After being placed in position, these coupling members are retained against longitudinal movement by set screws 15. The hubs or primary coupling members 12 and 13 are each provided with a flange 16 and 17, respectively. The distance between the ends of the shaft is slightly greater than the length of the primary coupling members so that they may be inserted between the ends of the shafts and then slid onto their respective shaft sections. After they are in position, the means for connecting said members is inserted between them and properly secured thereto.

This connecting means, in my preferred construction, comprises two opposed rings or secondary coupling members 18 and 19 which are secured, respectively, to the opposed flanges 16 and 17 by any suitable means, such as longitudinally extending screws 20. These screws are preferably applied with their heads countersunk in the flanges and provided with non-circular sockets 21 adapted for the insertion of a suitable wrench for removing and applying the same. By having the heads of these screws countersunk, the exterior surfaces of the coupling are smooth and there are no projections to catch on adjacent objects or render the coupling dangerous to workmen. The secondary couplings 18 and 19 are provided with non-circular central openings 22 and 23, respectively, adapted to receive the non-circular heads 24 of the floating link 25. The coupling 18 has an outwardly extending flange 26 at its inner end and the coupling 19 has a cylindrical flange 27 standing over and embracing the flange 26, the opening 28 in the flange 27 being substantially the same diameter as the flange 26 to allow for insertion and removal of the same, but the body portion of the flange 27 being larger in diameter than the flange 26 to allow relative movement between the two elements when they are in operative position, due to misalignment of the shafts or angular relation of the same. The flange 27, as will be noted, forms a covering for the space 29 between the secondary coupling members 18 and 19 to prevent entrance of dirt and to hold grease, this space being necessary to allow relative movement of the coupling in operation.

It will be apparent, from an inspection of Fig. 2, that, after the primary coupling members 12 and 13 are in position on the ends of the shaft sections, the secondary coupling members 18 and 19 may be inserted between the same with the floating link 25 in position, and then secured to the respective flanges 16 and 17 by the screws 20. In removing the coupling from the shaft the reverse operation is followed, the screws 20 being first removed and then the secondary coupling members 18 and 19 being drawn sideways from the position between the ends of the shaft and flanges 16 and 17, as indicated by dotted lines at the bottom of Fig. 2. There is plenty of clearance for sidewise movement of these members as they may have relative longitudinal movement due to the space 29. After the secondary coupling members are removed, the primary coupling members 12 and 13 may be removed by loosening the said screws 15 and sliding these members off the ends of the shaft sections, and sidewise through the space between the ends of these sections.

It will be apparent that this coupling is especially adapted for use on shafts which are already in position, as it may be applied without taking down the shaft or disturbing its bearings in any way. It may also be applied to shaft sections where there is not sufficient clearance between the bearings, indicated by dotted lines at 30, for the insertion of the ordinary coupling.

It will also be apparent, from an inspection of the drawing, that the device is very simple in construction and comprises but few parts and, therefore, may be made of substantial construction and it not liable to get out of order.

The floating link 25 is substantially the same as that disclosed in the copending application to Whitney and Kay, serial No. 461,171, filed April 13, 1921, and is not claimed specifically herein separately from the combination disclosed. I illustrate, however, in dotted lines in Fig. 4, how the ends of this link may be removed to shorten the same and thus shorten the space required by the coupling. The flat sides 31 are curved longitudinally, as shown at 32, on the arc of a circle, making the edges 33 between adjacent flat sides substantially an ellipse. As in operation the portion of the heads beyond the solid lines 34 is not used, it may be removed, shortening by that amount the total length required for the coupling. The heads of the link, which are substantially square as shown in Fig. 3, are offset angularly about the axis of the link substantially 45° so that the edges 33 of one head are in alignment with the opposite sides of the other head. This arrangement together with the longitudinally curved sides, eliminates the hori gori motion found in the usual flexible couplings and also gives more efficient operation.

Having thus set forth the nature of my invention, what I claim is:

1. A shaft coupling comprising a pair of complementary coupling members adapted to be secured to a pair of longitudinally spaced shaft sections, secondary coupling members removably secured to the opposed faces of the first mentioned members and provided with non-circular openings extending therethrough, one of the secondary members having a flange extending over and enclosing a portion of the other member, and a floating link connecting the secondary members provided with non-circular heads in said openings.

2. A shaft coupling comprising a pair of complementary coupling members adapted to be secured to a pair of longitudinally spaced shaft sections, said members being of such a length that they may be inserted between the spaced ends of the shaft sections and then slid onto their respective shaft sections, secondary coupling members removably secured to the first coupling members, said secondary members being movable to and removable from operative position through the space between the ends of the shaft sections and provided with non-circular openings extending therethrough, and a floating link provided with non-circular heads in the openings in the secondary members.

3. A shaft coupling comprising a pair of complementary coupling members adapted to be secured to a pair of longitudinally spaced shaft sections, said members being of such a length that they may be inserted between the spaced ends of the shaft sections and then slid onto their respective shaft sections, secondary coupling members removably secured to the opposed faces of the first mentioned coupling members and provided with polygonal openings extending therethrough, and a floating link connecting the secondary members and provided with polygonal heads in said openings, the heads being angularly offset about the axis of the link with the edges or corners of one head in alignment with the sides of the other head.

4. A shaft coupling comprising a pair of complementary coupling members adapted to be secured to a pair of longitudinally spaced shaft sections, said members being of such a length that they may be inserted between the spaced ends of the shaft sections and then slid onto their respective shaft sections, secondary coupling members removably secured to the opposed faces of the first mentioned coupling members and provided with substantially square openings extending longitudinally through said members, and a floating link connecting said members and having substantially square heads received in said openings, said heads being angularly offset about the axis of the link with the edges or corners of one head in alignment with the sides of the other head.

In testimony whereof I affix my signature.

GEORGE A. KAY.